Figure 1:
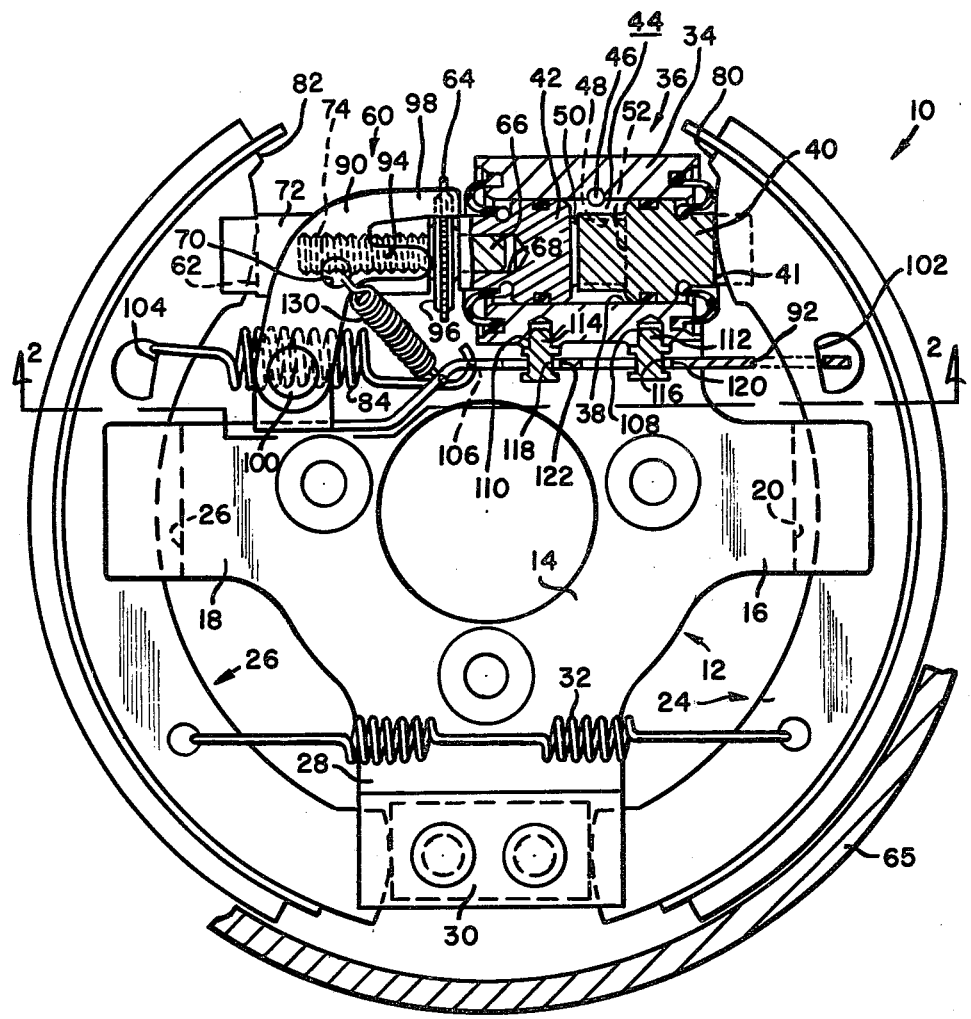

United States Patent [19]

Colpaert

[11] 4,353,438
[45] Oct. 12, 1982

[54] ACTUATOR ASSEMBLY FOR A DRUM BRAKE HAVING AN EXTENDIBLE ASSEMBLY

[75] Inventor: James J. Colpaert, Granger, Ind.

[73] Assignee: The Bendix Corporation, Southfield, Mich.

[21] Appl. No.: 193,224

[22] Filed: Oct. 2, 1980

[51] Int. Cl.³ .............................................. F16D 65/56
[52] U.S. Cl. ...................... 188/79.5 GC; 188/196 BA; 192/111 A
[58] Field of Search ............. 188/79.5 GC, 79.5 GE, 188/79.5 S, 79.5 P, 196 BA, 327, 328, 331, 364; 192/111 A

[56] References Cited

U.S. PATENT DOCUMENTS

| | | | |
|---|---|---|---|
| 2,084,400 | 6/1937 | LaBrie | 188/79.5 GC X |
| 2,389,618 | 11/1945 | Goepfrich . | |
| 3,216,534 | 11/1965 | Chouings et al. . | |
| 3,581,847 | 6/1971 | Torii et al. | 188/79.5 GE |
| 3,709,334 | 1/1973 | Kondo et al. | 188/196 BA X |
| 3,712,425 | 1/1973 | Torii et al. . | |
| 4,222,467 | 9/1980 | Kluger et al. | 188/79.5 P X |

FOREIGN PATENT DOCUMENTS

| | | | |
|---|---|---|---|
| 2722107 | 1/1979 | Fed. Rep. of Germany | 188/196 BA |
| 1544028 | 9/1968 | France | 188/79.5 GE |

Primary Examiner—George E. A. Halvosa
Attorney, Agent, or Firm—Paul David Schoenle; Ken C. Decker

[57] ABSTRACT

A drum brake assembly includes a wheel cylinder (36) and extendible assembly (60) disposed between adjoining ends of a pair of brake shoes. The wheel cylinder includes a pair of pistons (40,42) which are in abutting relation with each other and with the extendible assembly to substantially define a non-braking position for the pair of brake shoes. The extendible assembly is operable to move the pair of pistons within the wheel cylinder in response to an excessive clearance between the pair of brake shoes and a rotating drum.

8 Claims, 2 Drawing Figures

ACTUATOR ASSEMBLY FOR A DRUM BRAKE HAVING AN EXTENDIBLE ASSEMBLY

The invention relates to a drum brake assembly wherein a torque plate movably carries a pair of brake shoes and a wheel cylinder is operable during a brake application to move the pair of brake shoes from a non-braking position to a braking position. In order to compensate for brake shoe lining wear, an extendible assembly cooperates with the wheel cylinder and the pair of brake shoes to control the clearance between the pair of brake shoes and a rotatable member to be braked.

If the extendible assembly is combined with the wheel cylinder it is possible to mount an adjusting pawl on the wheel cylinder to control extension of the extendible assembly. However, in view of the location of the wheel cylinder at the outer radial periphery of the drum brake assembly there are space constraints which can interfer with the operation of the adjusting pawl.

The invention provides an actuator assembly comprising an adjusting pawl which is disposed to the side of the wheel cylinder in spaced relation thereto and a connecting member which supports the adjusting pawl. The connecting member engages one of the pair of brake shoes and cooperates with a retraction spring to bias the pair of brake shoes to the non-braking position. The connecting member is also engageable with the wheel cylinder to move with the one brake shoe in a predetermined direction. In a preferred embodiment the wheel cylinder is provided with a pair of openings for fixedly receiving a pair of plugs. The pair of plugs are provided with recesses for receiving the connecting member as the pair of lugs extend into a pair of slots on the connecting member.

It is an advantage of the invention that the adjusting pawl is carried independently of the wheel cylinder within the available spaces to the side of the wheel cylinder where the extendible assembly is disposed. With the connecting member supporting the adjusting pawl and the retraction spring attaching the connecting member to the drum brake assembly, it is easy to disassemble the adjusting pawl and connecting member by merely disengaging the retraction spring from the connecting member.

Figure 2:
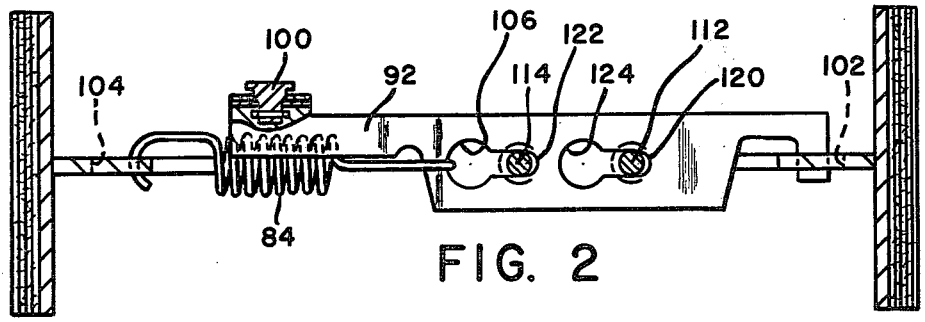

One way of carrying out the invention is described in detail below with reference to the accompanying drawings wherein:

FIG. 1 is a side view of a drum brake assembly partly cut away and constructed in accordance with the present invention; and FIG. 2 is a view taken substantially along line 2—2 of FIG. 1.

In FIG. 1, a drum brake assembly 10 includes a torque plate 12 which is adapted to be secured to a portion of an axle assembly in a vehicle. The torque plate 12 includes a center portion 14 with a pair of oppositely extending arms 16 and 18 which are slotted at 20 and 26 to receive a pair of brake shoes 24 and 26. The brake shoe 24 being the trailing shoe in a non-servo drum brake and the brake shoe 26 being the leading shoe in a non-servo drum brake. The torque plate 12 also includes an arm 28 defining an anchor 30 about which the pair of brake shoes pivot during a brake application. A spring 32 biases the pair of brake shoes into engagement with the anchor 30. Opposite the arm 28 is an offset arm 34 which integrally forms a hydraulic actuator or wheel cylinder 36.

The wheel cylinder 36 defines a bore 38 extending through the arm 34 and includes a first piston 40 extending outwardly to engage the brake shoe 24 via slot 41 and a second piston 42 cooperating with the first piston 40 to define a pressure chamber 44. An inlet 46 communicates with a brake fluid pressure generator, such as a master cylinder, for communicating fluid pressure to the pressure chamber 44 during a brake application. The first piston defines a rectangular recess 48 facing the piston 42 and the piston 42 includes a projecting portion 50 telescoping into the recess 48 and abutting a bottom wall 52 of the recess 48.

An extendible assembly 60 is carried by the piston 42 and is in engagement with the brake shoe 26 via slot 62. The extendible assembly 60 includes a star wheel 64 with a cylindrical stem 66 extending into a blind opening 68 on piston 42 and a threaded item 70 cooperating with a spacer 72 having internal threads 74.

The adjoining ends 80 and 82 of respective brake shoes 24 and 26 define a space therebetween which is occupied by the wheel cylinder and the extendible assembly. The offset wheel cylinder 36 occupies substantially one half of the space, while the extendible assembly 60 occupies one half the space. The wheel cylinder 36 is offset toward the trailing brake shoe 24 and the extendible assembly is adjoining the leading brake shoe 26. A retraction spring 84 cooperates with the pair of brake shoes in a manner described hereinafter to bias the latter to a non-braking position wherein each respective brake shoe 24 and 26 is abutting the bottom of slots 41 and 62 and the piston projection 50 is abutting the piston bottom wall 52.

In order to control extension of the extendible assembly 60 an adjusting pawl 90 is engageable with the star wheel 64 to impart rotation to the star wheel 64 in response to an excessive clearance between the pair of brake shoes and a rotating drum 65. The adjusting pawl 90 is pivotally carried on a connecting member 92 and is provided with a first arm 94 abutting a side wall 96 of the star wheel 64 at an intermediate radial position. A second arm 98 of the adjusting pawl 90 is engageable with ratchet teeth on the outer periphery of the star wheel. A pivot pin 100 secures the adjusting pawl 90 to the connecting member 92. The connecting member 92 extends into an opening 102 in brake shoe 24 to move with the latter during braking. The retraction spring 84 extends from an opening 104 in brake shoe 26 to an opening 106 in the connecting member to urge the connecting member and brake shoe 24 in the direction of brake shoe 26.

Viewing FIGS. 1 and 2, the wheel cylinder 36 includes a pair of openings 108 and 110 for fixedly receiving a pair of plugs 112 and 114. In the alternative, this pair of plugs could be integral with the wheel cylinder. The pair of plugs include recesses 116 and 118 and the connecting member 92 includes slots 120 and 122 for receiving the respective plugs 112 and 114 such that the connecting member 92 is disposed within the recesses. The slot 122 leads to the opening 106 and the slot 120 leads to an opening 124. The openings 106 and 124 are larger in diameter than the diameter of the plugs 112 and 114 so that the connecting member openings 106 and 124 are aligned with the plug recesses 116 and 118 and the end of the connecting member is inserted in the brake shoe opening 102 before the spring 84 is attached to the connecting member via opening 106. The spring biases the connecting member toward the brake shoe 26 to movably support the connecting member within the recesses 116 and 118.

In the non-braking position illustrated, the plugs 112 and 114 are disposed to the right side of the respective slots 120 and 122. As the brake shoes 24 and 26 experience lining wear the extendible assembly is operable to increase the dimension of the space between adjoining ends 80 and 82. This compensation for lining wear causes the plugs 112 and 114 to be repositioned away from the right end of slots 120 and 122 toward, but spaced from, the openings 124 and 106.

During a brake application, the brake shoes 24 and 26 are urged by the wheel cylinder and extendible assembly to separate from each other. The piston 42 biases the star wheel 64 to move to the left, viewing FIG. 1, while the brake shoe 24 pulls the connecting member 92 to the right. With the arm 94 abutting the side wall of star wheel 64, the adjusting pawl 90 is pivoted counterclockwise about pin 100. If the clearance between the brake shoes and rotatable drum is excessive, the pivoting motion of the adjusting pawl 90 will cause the arm 98 to index to a successive ratchet tooth on the star wheel. Consequently, upon termination of braking, the spring 130 which extends from the connecting member 92 to the adjusting pawl 90 causes the latter to rotate clockwise about pin 100 and impart rotation to the star wheel to extend the extendible assembly 60. This action enables the extendible assembly to cooperate with the abutting pair of pistons to reposition the pair of brake shoes in closer proximity to the rotatable drum.

I claim:

1. In a drum brake assembly having a pair of brake shoes movable by a wheel cylinder from a non-braking position to a braking position in engagement with a rotatable member, an extendible assembly disposed between and cooperating with the wheel cylinder and the pair of brake shoes to substantially maintain a predetermined clearance between the pair of brake shoes and the rotatable member and an actuator assembly cooperating with the extendible assembly to extend the latter in response to the clearance between the pair of brake shoes and the rotatable member being greater than the predetermined amount, characterized by said actuator assembly comprising an adjusting pawl in engagement with the extendible assembly and a connecting member in engagement with one of the pair of brake shoes to move in unison therewith and connected to a retraction spring to bias said pair of brake shoes to the non-braking position, said connecting member pivotally mounting said adjusting pawl at one end of said connecting member so as to space said adjusting pawl in relation to said wheel cylinder and said pair of brake shoes, and said connecting member being movably engaged with said wheel cylinder to guide the movement of said connecting member as the latter moves with one of said pair of brake shoes during a brake application.

2. The drum brake assembly of claim 1 further characterized by said connecting member including at least one slot and said wheel cylinder defines at least one plug extending into said one slot to substantially control the direction of movement for said connecting member and said retraction spring is coupled to said connecting member at an intermediate position between said one end and said one slot.

3. The drum brake assembly of claim 2 further characterized by said one plug defining a recess for movably receiving said connecting member.

4. The drum brake assembly of claim 1 further characterized by the extendible assembly including a star wheel with ratchet teeth on the outer periphery thereof and said adjusting pawl includes a first arm engageable with the ratchet teeth and said adjusting pawl includes a second arm pivotally abutting a side wall of said star wheel, said adjusting pawl pivoting relative to said connecting member and relative to the side wall during a brake application to move said first arm relative to said ratchet teeth.

5. The drum brake assembly of claim 1 further characterized by said connecting member including a slot for receiving a portion of the wheel cylinder and the retraction spring extends into said slot to bias the connecting member toward said other brake shoe.

6. In a drum brake assembly, the combination of a torque plate movably supporting a pair of brake shoes, said pair of brake shoes having adjoining ends defining a space therebetween to receive a wheel cylinder which is operable during a brake application to move said pair of brake shoes from a nonbraking position to a braking position, an extendible assembly disposed within said space in coaxial relation to said wheel cylinder and cooperating with said wheel cylinder to substantially define said non-braking position, an adjusting pawl in engagement with said extendible assembly to control extension of the latter, and a connecting member directly engageable with one of said pair of brake shoes for movement therewith, said connecting member also being connected with the other brake shoe via a retraction spring to bias said pair of brake shoes to said nonbraking position, said connecting member being in slidable engagement with said wheel cylinder such that said wheel cylinder limits the movement of said connecting member to a direction along its longitudinal axis, and said connecting member pivotally supports said adjusting pawl in spaced relation to said pair of brake shoes and wheel cylinder whereby said adjusting pawl pivots relative to said connecting member to control extension of said extendible assembly.

7. The drum brake assembly of claim 6 in which said connecting member and said extendible assembly cooperate to support said adjusting pawl independently of said wheel cylinder.

8. The drum brake assembly of claim 6 in which said wheel cylinder occupies substantially one-half of said space, said extendible assembly occupies the other half of said space, and said adjusting pawl is disposed completely within the other half of said space.

* * * * *